US012787004B2

(12) United States Patent
Dong

(10) Patent No.: US 12,787,004 B2
(45) Date of Patent: Nov. 3, 2026

(54) COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 397 days.

(21) Appl. No.: 18/274,592

(22) PCT Filed: Jan. 28, 2021

(86) PCT No.: PCT/CN2021/074174

§ 371 (c)(1),
(2) Date: Jul. 27, 2023

(87) PCT Pub. No.: WO2022/160185

PCT Pub. Date: Aug. 4, 2022

(65) Prior Publication Data

US 2024/0121039 A1 Apr. 11, 2024

(51) Int. Cl.
*H04W 72/20* (2023.01)
*H04L 5/00* (2006.01)
*H04W 16/14* (2009.01)

(52) U.S. Cl.
CPC .......... *H04W 72/20* (2023.01); *H04L 5/0048* (2013.01); *H04W 16/14* (2013.01)

(58) Field of Classification Search
CPC .................................................... H04W 72/20
See application file for complete search history.

(56) References Cited

U.S. PATENT DOCUMENTS

| | | | | |
|---|---|---|---|---|
| 2017/0325178 A1* | 11/2017 | Verma | H04W 52/242 |
| 2019/0007977 A1 | 1/2019 | Asterjadhi et al. | |
| 2021/0337546 A1* | 10/2021 | Kim | H04W 72/53 |
| 2022/0030604 A1* | 1/2022 | Noh | H04W 72/121 |
| 2022/0132371 A1* | 4/2022 | Wu | H04W 28/065 |

FOREIGN PATENT DOCUMENTS

| | | | |
|---|---|---|---|
| CN | 107925470 | A | 4/2018 |
| CN | 109479041 | A | 3/2019 |
| CN | 110521250 | A | 11/2019 |
| CN | 111970761 | A | 11/2020 |
| CN | 112039630 | A | 12/2020 |
| WO | 2020/112021 | A1 | 6/2020 |
| WO | 2020/143612 | A1 | 7/2020 |

OTHER PUBLICATIONS

Verma et al., Comment Resolutions on PHY Introduction Part 5, Mar. 2018, IEEE P802.11 (Year: 2018).*
Further discussion on RU allocation subfield in EHT-SIG, IEEE 802.11-20/0609r6 (Apr. 2020).

* cited by examiner

*Primary Examiner* — Jason E Mattis
(74) *Attorney, Agent, or Firm* — Volpe Koenig

(57) ABSTRACT

A communication method includes: determining a first message frame, the first message frame comprising information identifying the maximum single-type resource unit and/or the maximum composite resource unit supported when dual carrier modulation is used; and sending the first message frame.

20 Claims, 2 Drawing Sheets

COMMUNICATION METHOD AND COMMUNICATION DEVICE

CROSS REFERENCE TO RELATED APPLICATION

The present application is a U.S. National Stage of International Application No. PCT/CN2021/074174, filed on Jan. 28, 2021, the contents of all of which are incorporated herein by reference in their entireties for all purposes.

BACKGROUND

At present, the research range of the Wi-Fi technology is 320 MHz bandwidth transmission, aggregation and collaboration of a plurality of frequency bands and the like, and main application scenes of the Wi-Fi technology are video transmission, augmented reality (AR), virtual reality (VR), etc.

The aggregation and collaboration of the plurality of frequency bands refer to that devices simultaneously perform communication at multiple frequency bands.

SUMMARY

According to a communication method provided by an example of the disclosure, the communication method may include: determining a first message frame, the first message frame including: information identifying a maximum single-type resource unit and/or a maximum multiple resource unit supported for using dual carrier modulation; and sending the first message frame.

According to a communication method provided by an example of the disclosure, the communication method may include: receiving a first message frame, where the first message frame includes: information identifying a maximum single-type resource unit and/or a maximum multiple resource unit supported for using dual carrier modulation; and executing a communication operation based on the first message frame.

According to an electronic device provided by an example of the disclosure, the electronic device includes a memory, a processor and a computer program stored on the memory and capable of running on the processor. The processor, when executing the computer program, implements the method mentioned above.

BRIEF DESCRIPTION OF THE DRAWINGS

Examples of the disclosure are described in detail with reference to accompanying drawings, and the above and other features of examples of the disclosure will be clearer.

DETAILED DESCRIPTION

Figure 1:
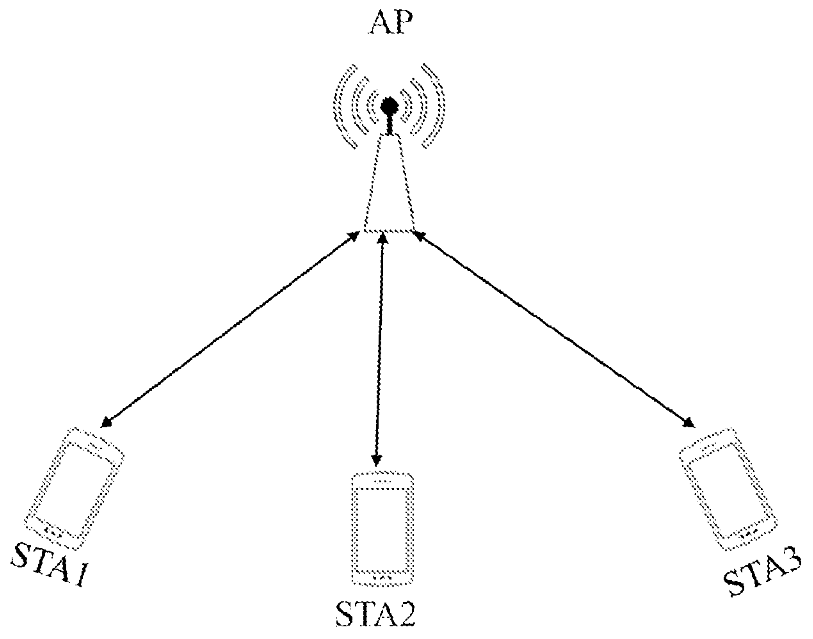
FIG. 1 is an example schematic diagram showing a wireless communication scene.

The following descriptions are provided with reference to the accompanying drawings to help comprehensively understand various examples of the disclosure limited by appended claims and equivalents. The various examples of the disclosure include various concrete details, however, these concrete details are merely considered as examples. In addition, for clarity and conciseness, descriptions of publicly known technologies, functions and constructions may be omitted.

It is to be understood that unless otherwise clearly stated in the context, a singular form used here may also include a plural form. It is to be further understood that a word "including" used in the disclosure refers to having described features, integers, steps, operations, elements and/or components, but does not exclude having or adding one or more other features, integers, steps, operations, elements, components and/or groups of them.

It is to be understood that although terms "first", "second" and the like in the content may be used for describing various elements here, these terms are merely used for distinguishing one element from another element. Hence, without departing from teachings of examples, a first element discussed below may be called a second element. In addition, a term "and/or" or an expression "at least a/at least one in . . . " here includes one or more of any or all combinations of related listed items. Unless otherwise defined, all terms (including technical terms and scientific terms) used here have the same meaning as generally understood by those ordinarily skilled in the art to which the disclosure belongs.

The disclosure relates to the field of wireless communication, in particular to a communication method and a communication device.

The research range of the Wi-Fi technology is 320 MHz bandwidth transmission, aggregation and collaboration of a plurality of frequency bands and the like, a rate and a throughput capability can be expected to be improved by at least four times than an existing standard, and main application scenes of the Wi-Fi technology are video transmission, augmented reality (AR), virtual reality (VR), etc.

The aggregation and collaboration of the plurality of frequency bands refer to that devices simultaneously perform communication at frequency bands of 2.4 GHz, 5.8 GHz and 6-7 GHZ, and for the devices simultaneously performing communication at the plurality of frequency bands, a new media access control (MAC) mechanism needs to be defined for management. In addition, multi-frequency-band aggregation and collaboration are further expected to support low-latency transmission.

In the multi-frequency-band aggregation and system technology, the supported maximum bandwidth is 320 MHz (160 MHz+160 MHz), and in addition, 240 MHz (160 MHz+80 MHz) and other bandwidths supported by the existing standard may further be supported.

In the technical field of communication, data transmission may be performed by using single-type resource units or multiple resource units. In addition, data transmission may further be performed by adopting a dual carrier modulation (DCM) technology. In some embodiments, DCM is merely applied to a single-type resource unit, rather than a multiple resource unit.

Various aspects of the disclosure will at least solve the above problems and/or defects. Various examples of the disclosure provide the following technical solutions.

According to a communication method provided by an example of the disclosure, the communication method may include: determining a first message frame, the first message frame including: information identifying a maximum single-type resource unit and/or a maximum multiple resource unit supported for using dual carrier modulation; and sending the first message frame.

According to a communication method provided by an example of the disclosure, the communication method may include: receiving a first message frame, where the first message frame includes: information identifying a maximum single-type resource unit and/or a maximum multiple resource unit supported for using dual carrier modulation; and executing a communication operation based on the first message frame.

According to a communication device provided by an example of the disclosure, the communication device may include: a processing module, configured to determine a first message frame, the first message frame including information identifying a maximum single-type resource unit and/or a maximum multiple resource unit supported for using dual carrier modulation; and a communication module, configured to send the first message frame.

According to a communication device provided by an example of the disclosure, the communication device may include: a communication module, configured to receive a first message frame, where the first message frame includes information identifying a maximum single-type resource unit and/or a maximum multiple resource unit supported for using dual carrier modulation; and a processing module, configured to control the communication module to execute a communication operation based on the first message frame.

According to an electronic device provided by an example of the disclosure, the electronic device includes a memory, a processor and a computer program stored on the memory and capable of running on the processor. The processor, when executing the computer program, implements the method mentioned above.

According to a non-temporary computer readable storage medium provided by an example of the disclosure, the non-temporary computer readable storage medium stores a computer program, and the computer program, when executed by a processor, implements the method mentioned above.

The technical solutions provided by the examples of the disclosure may apply DCM to the single-type resource unit and the multiple resource unit, so as to improve the spectrum utilization.

FIG. 1 is an example schematic diagram showing a wireless communication scene.

In a wireless local area network, a basis service set (BSS) may be formed by an access point (AP) and one or more stations (STA) in communication with the AP. One basis service set may be linked to a distribution system (DS), not shown, through its AP, and then accessed to another basis service set, as so to form an extended service set (ESS), not shown.

The AP is a wireless switch or a router for a wireless network, and also is a core of the wireless network. An AP device may be used as a wireless base station, and mainly used as a bridge for linking a wireless network and a wired network. Wired and wireless networks may be integrated by means of this kind of AP.

As an example, the AP may include software applications and/or circuits, so that other types of nodes in the wireless network may communicate with an exterior and an interior of the wireless network through the AP. For example, the AP may be a terminal device or a network device equipped with a wireless fidelity (Wi-Fi) chip.

As an example, the station (STA) may include but is not limited to: a cell phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

Although in FIG. 1, one AP and three stations (STA1, STA2 and STA3) are shown for communication, it is merely an example, and examples of the disclosure are not limited to this. For example, there may be any number and/or any type of the AP and the STA.

In addition, the AP and the stations (STA1, STA2 and STA3) may be a multi-link device (MLD) supporting a multi-link communication function. In an example, an access point supporting the multi-link communication function may be expressed as AP MLD, and the station supporting the multi-link communication function may be expressed as non-AP STA MLD. A plurality of links may exist between the AP MLD and the non-AP STA MLD, and under each link in the plurality of links, the attached AP of the AP MLD may communicate with the corresponding attached STA of the non-AP STA MLD. The plurality of links may be a plurality of links at different frequencies, such as links at 2.4 GHz, 5 GHZ and 6 GHZ, etc., or several links of the same bandwidth or different bandwidths at 2.4 GHz, 5 GHz and 6 GHz. In addition, a plurality of channels may exist under each link.

In the current communication technology, data may be transmitted by using a single-type resource unit and/or a multiple resource unit. In a case that a DCM technology is used for executing data communication between the AP and the station, a size of a maximum resource unit supported in a case that the AP or the station use the DCM may be defined. However, in an existing technology, DCM is merely applied to the single-type resource unit. Hence, improvement is performed according to conceptions of the disclosure. Further, the DCM may be not only applied to the single-type resource unit, but also applied to the multiple resource unit.

Figure 2:
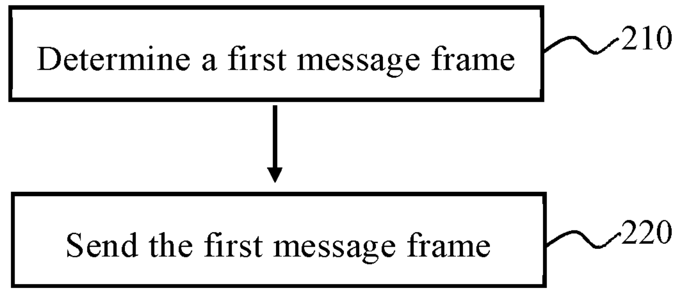
FIG. 2 is a flowchart showing a communication method according to an example of the disclosure.

FIG. 2 is a flowchart showing a communication method according to an example of the disclosure. In an example of the disclosure, the communication method shown in FIG. 2 may be an operation executed by a sender, the communication method shown in FIG. 2 may be applied to the multi-link communication mentioned above. For example, the sender may be one of the AP MLD or the non-AP STA MLD, and the communication method shown in FIG. 2 may be an operation executed under at least one link in a plurality of links between the AP MLD and the non-AP STA MLD. However, this is merely an example, and the disclosure is not limited to this, for example, the communication method shown in FIG. 2 may also be applied to an access point or a station merely supporting single-link communication.

According to the example, in a case that the DCM is used and the sender is the access point (such as AP MLD), ways shown below may be adopted for modulation: binary phase shifting keying (BPSK) DCM, quadrature phase shift keying (QPSK) DCM, or 16 quadrature amplitude modulation (16-QAM) DCM, and in a case that the sender is the station (such as non-AP STA MLD), a way of BPSK DCM may be adopted for modulation. However, it is merely an example, does not limit the disclosure.

Referring to FIG. 2, steps 210 and 220 are included in the method. In step 210, the first message frame may be determined. The first message frame may include information identifying a maximum single-type resource unit and/or a maximum multiple resource unit supported for using dual carrier modulation (DCM).

In an example of the disclosure, there may be many ways to determine the first message frame. For example, the sender may generate the first message frame according to at least one of the following: a network condition, a load condition, hardware capability of a sending device, service types, and related agreement stipulations; and the example of the disclosure does not make specific limitation. In an example of the disclosure, the sender may further obtain the first message frame from an external device, which is not specifically limited in the example of the disclosure.

In an example of the disclosure, the AP MLD may serve as the sender to execute the communication method of FIG. 2. In this case, the first message frame may be a beacon frame, an association response frame, a reassociation response frame, or a probe response frame. Additionally, the first message frame may include: information identifying a maximum single-type resource unit and/or a maximum multiple resource unit supported in response to determining that the AP MLD uses the DCM. In another example of the disclosure, non-AP STA MLD may serve as the sender to execute the communication method in FIG. 2. In this case, the first message frame may be an association request frame, a reassociation request frame, or a probe request frame. Additionally, the first message frame may include: information identifying a maximum single-type resource unit and/or a maximum multiple resource unit supported in response to determining that the non-AP STA MLD uses the DCM. However, examples of the above frames are merely schematic, and do not limit the disclosure, and other frames used for transmitting information are also feasible.

In an example of the disclosure, the single-type resource unit may refer to a resource unit merely including the specific quantity of tones. For example, the single-type resource unit may be 26-tone, 52-tone, 106-tone, 242-tone, 484-tone, 996-tone, 2*996-tone, or 4*996-tone. According to the example, the maximum single-type resource unit supported for using the DCM may be one of the above shown single-type resource units.

In an example of the disclosure, the multiple resource unit may be composed of single-type resource units. In an example, the multiple resource unit may be composed of at least two specific single-type resource units. For example, the multiple resource unit may at least include: a first single-type resource unit and a second single-type resource unit, and the first single-type resource unit and the second single-type resource unit have different quantities of tones. In other words, the multiple resource unit may be composed of at least two kinds of different single-type resource units, for example, 52+26-tone, 106+26-tone, 484+242-tone, 996+484-tone, 996+484+242-tone, 2×996+484-tone, 3×996-tone, 3×996+484-tone, etc. According to the example, the maximum multiple resource unit supported for using the DCM may be one of the above shown multiple resource units.

It is to be understood that the above single-type resource unit and the multiple resource unit are merely examples, and do not limit the scope of the example of the disclosure. In addition, it is to be further understood that an example of the above multiple resource unit is merely intended to explain but not to limit the scope of the disclosure, for example, each multiple resource unit and the number of them in the example may be different from the above example and are other variations.

According to an example, the information identifying the maximum single-type resource unit and/or the maximum multiple resource unit supported for using the DCM may be identified by a plurality of bits in the first message frame. In the example of the disclosure, a first part of the plurality of bits may be used for identifying the supported maximum single-type resource unit, and a second part of the plurality of bits may be used for identifying the supported maximum multiple resource unit. According to the example of the disclosure, different ways may be adopted to identify the supported maximum single-type resource unit and the supported maximum multiple resource unit (may be called the single-type resource unit and the multiple resource unit as follows for convenient description) through the plurality of bits.

In an example of the disclosure, the single-type resource unit and the multiple resource unit may be intensively identified.

In some examples, the plurality of bits for identifying the single-type resource unit and/or the multiple resource unit may be located in the same information element of the first message frame. In other words, both the first part and the second part of the plurality of bits may be included in a first capability information element of the first message frame. For example, the first capability information element may be an extreme high-throughput (EHT) physical layer (PHY) capability information element, and the information identifying the maximum single-type resource unit and/or the maximum multiple resource unit supported for using the DCM may be a subfield in an EHT PHY capability information element, such as DCM Max RU and MRU. It is to be understood that the DCM Max RU and MRU here may refer to maximum values of the single-type resource unit and the multiple resource unit applied to the DCM.

According to the example of the disclosure, the intensive identifier (DCM Max RU and MRU subfield) in the EHT PHY capability information element may be shown as Table 1 below.

TABLE 1

DCM Max RU and MRU of EHT PHY capability information element

| B7 | B6 | B5 | B4 | B3 | B2 | B1 | B0 |
|---|---|---|---|---|---|---|---|
| Multi resource unit | | | | Single-type resource unit | | | |

Referring to Table 1, B0 to B7 merely represents 8 bits of the DCM Max RU and MRU subfield, not represents all subfields in the EHT PHY capability information element, and in other words, the EHT PHY capability information element may further include other capability information. In the example of the disclosure, the DCM Max RU and MRU may be identified by the plurality of bits (for example, 8 bits B0 to B7 of one byte). For example, the first four bits (B0 to B3) in the 8 bits may be used for identifying the supported maximum single-type resource unit, and specific arrangement may be shown in Table 2 below; and last four bits (B4 to B7) in the 8 bits may be used for identifying the supported maximum multiple resource unit, and specific arrangement may be shown in Table 3 below. It is to be understood that although Table 1 shows that the first four bits correspond to four low bits in the 8 bits of one byte, the last four bits correspond to four high bits in the 8 bits of one byte, however, the disclosure is not limited to this, for example, the first four bits may correspond to the four high bits, and the last four bits may correspond to the four low bits. In addition, the number of bits of the DCM Max RU and MRU is also not limited to 8 bits of one byte, and it is also feasible to differentially identifying other numbers of bits of each single-type resource unit or multiple resource unit. In the following, for convenient description, description is made with reference to an implementation shown in Table 1.

TABLE 2

| Identifier of single-type resource unit | |
|---|---|
| Bit value (decimal) | Size of the maximum single-type resource unit |
| 0 | 242-tone |
| 1 | 484-tone |
| 2 | 996-tone |
| 3 | 2*996-tone |
| 4 | 4*996-tone |
| 5~15 | reserved |

TABLE 3

| Identifier of multi resource unit | |
|---|---|
| Bit value (decimal) | Size of the maximum multi resource unit |
| 0 | 52 + 26-tone |
| 1 | 106 + 26-tone |
| 2 | 484 + 242-tone |
| 3 | 996 + 484-tone |
| 4 | 996 + 484 + 242-tone |
| 5 | 2*996 + 484-tone |
| 6 | 3*996-tone |
| 7 | 3*996 + 484-tone |
| 8~15 | reserved |

It may be understood that each element shown in Table 1 to Table 3 is separate, and these elements are listed in the same table as an example, which does not represent that all elements in the table need to exist at the same time as shown in the table. A value of each element does not rely on any of other element values in Table 1 to Table 3. Hence, those skilled in the art may understand that the value of each element in the Table of the disclosure is a separate example.

Referring to Table 1 to Table 3, in a case of intensively identifying, the DCM Max RU and MRU of one byte (8 bits) in the EHT PHY capability information element may be used for identifying the maximum values of the single-type resource unit and the multiple resource unit that the DCM is applied to. For example, the first four bits are used for identifying the supported maximum single-type resource unit, namely, 0:242-tone, 1:484-tone, 2:996-tone, 3:2*996-tone, 4:4*996-tone RU, and other values are reserved; and the last four bits are used for identifying the supported maximum multiple resource unit, namely, 0:52+26-tone, 1:106+26-tone, 2:484+242-tone, 3:996+484-tone, 4:996+484+242-tone, 5:2*996+484-tone, 6:3*996-tone, 7:3*996+484, and other values are reserved. It is to be understood that values of Table 2 and Table 3 are merely examples, and do not necessarily include each value or may further include other values. For example, in Table 3, the following condition may exist: the supported maximum multiple resource unit merely includes one of 484+242-tone, 996+484-tone, 996+484+242-tone, 2*996+484-tone, 3*996-tone and 3*996+484-tone, but does not include 52+26-tone and 106+26-tone; and under this condition, a bit value 0 and a bit value 1 in Table 3 may be omitted, and a bit value corresponding to each multiple resource unit may be reset.

According to an example of the disclosure, the DCM Max RU and MRU may simultaneously identify the maximum single-type resource unit and the maximum multiple resource unit. For example, in the EHT PHY capability information element of the first message frame, the DCM Max RU and MRU may be set 01100001 (the first four bits 0001 correspond to a decimal value 1, and the last four bits 0110 correspond to a decimal value 6), so as to identify the maximum single-type resource unit applied to the DCM to be 484-tone and the maximum multiple resource unit to be 3*996-tone. It is to be understood that although the DCM Max RU and MRU may simultaneously identify the maximum single-type resource unit and the maximum multiple resource unit. However, in a case that the resource units are used for communication, one resource unit is merely selected for executing data transmission.

In another example of the disclosure, the single-type resource unit and the multiple resource unit may be separately identified. In this case, the single-type resource unit and the multiple resource unit may be identified in different information elements of the first message frame.

As described above, information for identifying the maximum single-type resource unit and/or the maximum multiple resource unit supported for using the DCM may be identified by a plurality of bits. Where a first part of the plurality of bits may be used for identifying the supported maximum single-type resource unit, and a second part of the plurality of bits may be used for identifying the supported maximum multiple resource unit. In a case that the single-type resource unit and the multiple resource unit are separately identified, a first bit in the first part used for identifying the supported first single-type resource unit (identifying the single-type resource unit) and the second part (identifying the multiple resource unit) may be both included in a first capability information element (such as an EHT PHY capability information element) of the first message frame. Other bits in the first part used for identifying supported other single-type resource units may be included in a second capability information element (such as a high efficiency (HE) PHY capability information element), and the other single-type resource units are different from the first single-type resource unit. According to the example, the first single-type resource unit may be 4*996-tone, and the other single-type resource units may be 242-tone, 484-tone, 996-tone or 2*996-tone, etc.

According to the example of the disclosure, examples of separately identifying in the HE PHY capability information element and the EHT PHY capability information element may be shown in Table 4 and Table 5 below.

TABLE 4

| DCM max RU in HE PHY capability information element | |
|---|---|
| B1 | B0 |

TABLE 5

DCM max MRU of EHT PHY capability information element and another bit

| … | $B_{k3}$ | $B_{k2}$ | $B_{k1}$ | … | $B_k$ | … |
|---|---|---|---|---|---|---|
| | Multi resource unit | | | | Single-type resource unit | |

Referring to Table 4, B0 and B1 merely represent 2 bits used for identifying the single-type resource unit in the HE PHY capability information element, and do not represent all subfields in the HE PHY capability information element.

In other words, the HE PHY capability information element may further include other capability information. Similarly, referring to Table 5, $B_k$ and $B_{k1}$ to $B_{k3}$ merely represent one bit (namely, the above first bit) used for identifying the single-type resource unit in the EHT PHY capability information element and three bits (namely, the above second part) used for identifying the multiple resource unit, and do not represent all subfields in the EHT PHY capability information element. In other words, the EHT PHY capability information element may further include other capability information. In addition, $B_k$ and $B_{k1}$ to $B_{k3}$ may belong to different subfields, or belong to the same subfield (for example, all belonging to DCM max MRU). In addition, it is to be further understood that the number of bits shown in Table 4 and Table 5 is merely an example, but does not limit the disclosure, and other more or less bits are also feasible.

Referring to Table 5, according to an example of the disclosure, in a case of separately identifying, one bit (the first bit $B_k$) in the EHT PHY capability information element may be used for identifying DCM being applied to 4*996-tone. For example, in a case that the first bit ($B_k$) is set as a first value (for example 1), the maximum 4*996-tone single-type resource unit supported for using the DCM is identified. In a case that the first bit ($B_k$) is set as a second value (for example 0), not supporting 4*996-tone is identified, in a case that the single-type resource unit less than 4*996-tone is supported, 242-tone, 484-tone, 996-tone and 2*996-tone may be identified by reusing the DCM max RU subfield in the HE PHY capability information element shown in Table 4. For example, the DCM max RU subfield in the HE PHY capability information element may have 2 bits (namely, B0 and B1 in Table 4), used for identifying other single-type resource units, and B0 and B1 in Table 4 may be set as similar to bit values 0 to 3 in Table 2, so as to identify the single-type resource units, namely, 0:242-tone, 1:484-tone, 2:996-tone, and 3:2*996-tone. For a device supporting an extreme high-throughput (EHT) standard, in a case that the single-type resource unit less than 4*996-tone is supported, the DCM max RU subfield in the HE PHY capability information element may be set or parsed to identify the supported maximum single-type resource unit.

According to the example of the disclosure, in a case that the first bit ($B_k$) identifies the supported first single-type resource unit, the second bits (B0 and B1) in the other bits may identify a supported second single-type resource unit, and a size of the second single-type resource unit is half of a size of the first single-type resource unit. In other words, the first single-type resource unit may be 4*996-tone, and the second single-type resource unit may be 2*996-tone.

For example, in a case that a sender supports the DCM being applied to the resource unit of 4*996-tone (namely, 1 bit (the first bit $B_k$) in the EHT PHY capability information element is set as the first value), the DCM max RU subfields (B0 and B1) in the HE PHY capability information element may be set as 3, so as to identify supporting 2*996-tone. This identifying method may implement backward compatibility.

For example, in a case that the sender does not support the DCM being applied to the resource unit of 4*996-tone (namely, 1 bit (the first bit $B_k$) in the EHT PHY capability information element is set as the second value), DCM max RU subfields ((B0 and B1) having two bits in the HE PHY capability information element may be set to identify the maximum single-type resource unit, as mentioned above, 0:242-tone, 1:484-tone, 2:996-tone, and 3:2*996-tone.

According to an example of the disclosure, in a case of separately identifying, the DCM being applied to different multiple resource units may be identified in the EHT PHY capability information element. For example, DCM max MRU (namely, the second part) may be defined in EHT PHY capability information element, as shown in Table 5. According to the example, the DCM max MRU (namely, the second part) may have 3 bits, for example, $B_{k1}$ to $B_{k3}$ in Table 5. According to the example, the DCM max MRU ($B_{k1}$ to $B_{k3}$) may be set as similar to bit values 0 to 7 in Table 3, so as to identify the supported maximum multiple resource unit (MRU). In other words, in a case that values of bits ($B_{k1}$ to $B_{k3}$) of the DCM max MRU are set as 0, the supported maximum MRU is: 52+26-tone. In a case that values of bits ($B_{k1}$ to $B_{k3}$) of the DCM max MRU are set as 1, the supported maximum MRU is: 106+26-tone. In a case that values of bits ($B_{k1}$ to $B_{k3}$) of the DCM max MRU are set as 2, the supported maximum MRU is: 484+242-tone. In a case that values of bits ($B_{k1}$ to $B_{k3}$) of the DCM max MRU are set as 3, the supported maximum MRU is: 996+484-tone. In a case that values of bits ($B_{k1}$ to $B_{k3}$) of the DCM max MRU are set as 4, the supported maximum MRU is: 996+484+242-tone. In a case that values of bits ($B_{k1}$ to $B_{k3}$) of the DCM max MRU are set as 5, the supported maximum MRU is: 2*996+484-tone. In a case that values of bits ($B_{k1}$ to $B_{k3}$) of the DCM max MRU are set as 6, the supported maximum MRU is: 3*996-tone. And in a case that values of bits ($B_{k1}$ to $B_{k3}$) of the DCM max MRU are set as 7, the supported maximum MRU is: 3*996+484-tone.

In addition, it is to be understood that similar to descriptions of Table 2 and Table 3, values of Table 4 and Table 5 are merely examples, and do not necessarily include each value or may further include other values. For example, in Table 5, the following conditions may exist: the supported maximum multiple resource unit merely includes one of 484+242-tone, 996+484-tone, 996+484+242-tone, 2*996+484-tone, 3*996-tone and 3*996+484-tone, but does not include (namely, omitting identifying) 52+26-tone and 106+26-tone.

It is to be understood that values of the number of bits of the above DCM max RU and MRU subfields the DCM max MRU subfield and/or DCM max RU subfield are merely examples, and do not limit the disclosure, and other values and set ways are also feasible.

Returning to FIG. 2, in step 220, the first message frame is sent. The sender may inform a receiver of capability information of the sender by sending the first message frame (for example, as shown above, the first message frame may carry a size of a maximum resource unit supported for using the DCM in the EHT PHY capability information element and/or the HE PHY capability information element), so that the sender and the receiver may execute a communication operation such as data transmission according to the corresponding capability.

Figure 3:
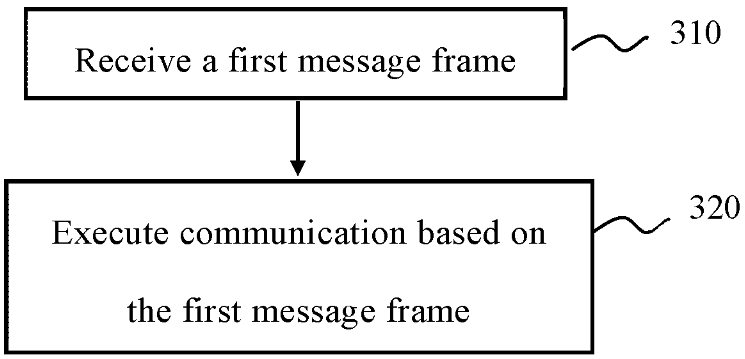
FIG. 3 is a flowchart showing another communication method according to an example of the disclosure.

FIG. 3 is a flowchart showing a communication method according to another example of the disclosure. In the example of the disclosure, the communication method shown in FIG. 3 may be an operation executed by a receiver, and the communication method shown in FIG. 3 may be applied to the above mentioned multi-link communication. For example, the communication method shown in FIG. 3 may be an operation executed under at least one link in a plurality of links between AP MLD and non-AP STA MLD. For example, in a case that the sender executing the communication method shown in FIG. 2 is one of the AP MLD and the non-AP STA MLD, the receiver executing the communication method shown in FIG. 3 may be the other one of the AP MLD and the non-AP STA MLD. It is to be understood that the description here is merely an example, and the disclosure is not limited to this, for example, the communication method shown in FIG. 3 may also be applied to an access point or a station merely supporting single-link communication.

Referring to FIG. 3, steps 310 and 320 are included in the method. In step 310, the first message frame may be received. The first message frame may include: information identifying a maximum single-type resource unit and/or a maximum multiple resource unit supported for using dual carrier modulation.

For example, in a case that the AP MLD, serving as the sender, sends the first message frame, non-AP STA MLD may serve as the receiver, and the received first message frame may be a beacon frame, an association response frame, a reassociation response frame, or a probe response frame. The first message frame may include: information identifying a maximum single-type resource unit and/or a maximum multiple resource unit supported in response to determining that the DCM is used by the AP MLD. In another example of the disclosure, in a case that the non-AP STA MLD, serving as the sender, sends the first message frame, AP MLD may serve as the receiver, and the first message frame may be an association request frame, a reassociation request frame, or a probe request frame. The received first message frame may include: information identifying a maximum single-type resource unit and/or a maximum multiple resource unit supported in response to determining that the DCM is used by the non-AP STA MLD. The descriptions about the single-type resource unit and the multiple resource unit may be similar to the description in step 210 in FIG. 2, and for conciseness, the repeated description is omitted here.

According to an example of the disclosure, in the first message frame, the information identifying the maximum single-type resource unit and/or the maximum multiple resource unit supported for using the dual carrier modulation may be identified by a plurality of bits. According to the example of the disclosure, a first part of the plurality of bits may be used for identifying the supported maximum single-type resource unit, and a second part of the plurality of bits may be used for identifying the supported maximum multiple resource unit.

According to the example of the disclosure, both the first part and the second part of the plurality of bits may be included in a first capability information element (for example, an EHT PHY capability information element) of the first message frame. The example here may be similar to the example of intensively identifying in step 210 in FIG. 2, and for conciseness, the repeated description is omitted here.

According to an example of the disclosure, a first bit in the first part used for identifying the supported first single-type resource unit (for example, 4*996-tone) and the second part may be both included in the first capability information element (for example, the EHT PHY capability information element) of the first message frame. According to the example of the disclosure, other bits in the first part used for identifying the supported other single-type resource units (for example, 242-tone, 484-tone, 996-tone or 2*996-tone, etc.) are included in a second capability information element (for example, a HE PHY capability information element), and the other single-type resource units are different from the first single-type resource unit. According to the example of the disclosure, in a case that the first bit identifies the supported first single-type resource unit, the second bits in the other bits identify the supported second single-type resource unit, a size of the second single-type resource unit is half of a size of the first single-type resource unit. Namely, the first single-type resource unit may be 4*996-tone, and the second single-type resource unit may be 2*996-tone. The example here may be similar to the example of separately identifying in step 210 in FIG. 2, and for conciseness, the repeated description is omitted here.

Continuing to refer to FIG. 3, in step 320, a communication operation may be executed based on the first message frame. For example, the receiver may obtain the capability information (for example, the maximum resource unit supported for using the DCM) of the sender from the information carried in the first message frame. Hence, the receiver and the sender may execute the communication operation such as data transmission according to the corresponding capability.

Figure 4:
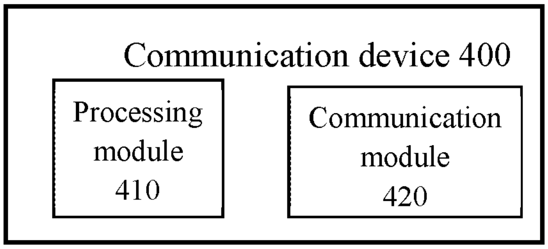
FIG. 4 is a block diagram showing a communication device according to an example of the disclosure.

FIG. 4 is a block diagram showing a communication device 400 according to an example of the disclosure. The communication device 400 shown in FIG. 4 may be a device supporting multi-link communication, and may include a processing module 410 and a communication module 420.

The communication device 400 shown in FIG. 4 may be applied to a sender. In this case, the processing module 410 may be configured to determine a first message frame. The first message frame may include information identifying a maximum single-type resource unit and/or a maximum multiple resource unit supported for using the dual carrier modulation. The communication module 420 may send the first message frame. In other words, in a case that the communication device 400 shown in FIG. 4 may be applied to the sender, the processing module 410 and a communication module 420 may execute an operation described with reference to FIG. 2, and for conciseness, the repeated description may be omitted here.

The communication device 400 shown in FIG. 4 may be applied to a receiver. In this case, the communication module 420 may be configured to receive the first message frame. The first message frame may include: the information identifying the maximum single-type resource unit and/or the maximum multiple resource unit supported for using the dual carrier modulation. The processing module 410 may be configured to: control the communication module 420 to execute a communication operation based on the first message frame. In other words, in a case that the communication device 400 shown in FIG. 4 may be applied to the receiver, the processing module 410 and the communication module 420 may execute an operation described with reference to FIG. 3, and for conciseness, the repeated description may be omitted here.

According to an example of the disclosure, in the first message frame, the information identifying the maximum single-type resource unit and/or the maximum multiple resource unit supported for using the dual carrier modulation may be identified by a plurality of bits. According to the example of the disclosure, a first part of the plurality of bits may be used for identifying the supported maximum single-type resource unit, and a second part of the plurality of bits may be used for identifying the supported maximum multiple resource unit.

According to the example of the disclosure, both the first part and the second part of the plurality of bits may be included in a first capability information element (for example, an EHT PHY capability information element) of the first message frame. The example here may be similar to the example of intensively identifying in step 210 in FIG. 2, and for conciseness, the repeated description is omitted here.

According to an example of the disclosure, in a case of intensively identifying, similar to Table 1 to Table 3 described with reference to step 210 in FIG. 2, DCM max RU and MRU of one byte (8 bits) in the EHT PHY capability information element of the first message frame may be used for identifying maximum values of the single-type resource unit and the multiple resource unit that the DCM is applied to. For example, the first four bits are used for identifying the supported maximum single-type resource unit, namely, 0:242-tone, 1:484-tone, 2:996-tone, 3: 2*996-tone, 4:4*996-tone RU, and other values are reserved. Additionally, the last four bits are used for identifying the supported maximum multiple resource unit, namely, 0:52+26-tone, 1:106+26-tone, 2:484+242-tone, 3:996+484-tone, 4:996+484+242-tone, 5:2*996+484-tone, 6:3*996-tone, 7:3*996+484, and other values are reserved.

According to the example of the disclosure, a first bit in the first part used for identifying the supported first single-type resource unit (for example, 4*996-tone) and the second part may be both included in the first capability information element (for example, the EHT PHY capability information element) of the first message frame. According to the example of the disclosure, other bits in the first part used for identifying the supported other single-type resource units (for example, 242-tone, 484-tone, 996-tone or 2*996-tone, etc.) are included in the second capability information element (for example, a HE PHY capability information element), and the other single-type resource units are different from the first single-type resource unit. According to the example of the disclosure, in a case that the first bit identifies the supported first single-type resource unit, the second bits in the other bits identify a supported second single-type resource unit, a size of the second single-type resource unit is half of a size of the first single-type resource unit. Namely, the first single-type resource unit may be 4*996-tone, and the second single-type resource unit may be 2*996-tone. The example here may be similar to the example of separately identifying in step 210 in FIG. 2, and for conciseness, the repeated description is omitted here.

According to an example of the disclosure, in a case of separately identifying, similar to Table 4 to Table 5 described with reference to step 210 in FIG. 2, one bit (the first bit) in the EHT PHY capability information element of the first message frame may be used for identifying the DCM being applied to 4*996-tone. For example, in a case that the first bit is set as a first value (for example 1), the single-type resource unit of the maximum 4*996-tone supported for using the DCM is identified. And in a case that the first bit is set as a second value (for example 0), not supporting 4*996-tone is identified. In addition, DCM max RU subfields in the HE PHY capability information element may be reused for identifying 242-tone, 484-tone, 996-tone and 2*996-tone. For example, the DCM max RU subfields in the HE PHY capability information element may have 2 bits for identifying other single-type resource units, and the single-type resource unit may be identified with reference to setting of bit values 0 to 3 in Table 2, namely, 0:242-tone, 1:484-tone, 2:996-tone, and 3:2*996-tone.

According to the example of the disclosure, in a case of supporting the DCM being applied to the resource unit of 4*996-tone (namely, one bit (the first bit) in the EHT PHY capability information element is set as a first value), the DCM max RU subfield in the HE PHY capability information element is set as 3, so as to identify supporting 2*996-tone, and may implement backward compatibility.

According to the example of the disclosure, in a case of not supporting the DCM being applied to the resource unit of 4*996-tone (namely, one bit (the first bit) in the EHT PHY capability information element is set as a second value), the DCM max RU subfield having two bits may be set in the HE PHY capability information element to identify the maximum single-type resource unit, as mentioned above, 0:242-tone, 1:484-tone, 2:996-tone, and 3:2*996-tone.

It is to be understood that the configuration of the communication device 400 in FIG. 4 is merely an example, and the example of the disclosure is not limited to this. For example, the communication device 400 may further include other modules, such as a memory, an input/output device, etc. In addition, modules in the communication device 400 may be combined into a more complex module, or may be divided into more separate modules, so as to support various functions.

According to the communication method described in FIG. 2 and FIG. 3 and the communication device described in FIG. 4, the DCM may be not only applied to the single-type resource unit, but also applied to the multiple resource unit, and hence, the spectrum utilization may be improved.

Based on a principle the same as the method provided by the example of the disclosure, an example of the disclosure further provides an electronic device, and the electronic device includes a processor and a memory. The memory stores a machine readable instruction (may also be called "a computer program"); and the processor is configured to execute the machine readable instruction to implement the method described with reference to FIG. 2 and FIG. 3.

An example of the disclosure further provides a non-transitory computer readable storage medium, the non-transitory computer readable storage medium stores a computer program, and the computer program, when executed by a processor, implements the methods described with reference to FIG. 2 and FIG. 3.

In an example, the processor may be a logic box, a module and a circuit configured to implement or execute various examples described combined with the contents of the disclosure, a central processing unit (CPU), a general-purpose processor, a digital signal processor (DSP), an application specific integrated circuit (ASIC), a field programmable gate array (FPGA) or other programmable logic devices, transistor logic devices, hardware components or any combination of them. The processor may also be a combination implementing a computing function, for example, a combination including one or more microprocessors, a combination of the DSP and a microprocessor, etc.

In an example, the memory may be, for example, a read only memory (ROM), a random access memory (RAM), an electrically erasable programmable read only memory (EEPROM), a compact disc read only memory (CD-ROM) or other compact disc storage, optical disc storage (including a compact optical disc, a laser disc, an optical disc, a digital universal optical disc, a blue-ray optical disc, etc.) a magnetic disc storage medium or other magnetic storage devices, or any other medium that may be used for carrying or storing program codes having instructions or data structure forms and capable of being accessed by a computer, but not limited to this.

It is to be understood that although all steps in flowcharts of the accompanying drawings are sequentially displayed according to an indication of arrows, these steps are not necessarily sequentially executed according to an order of the arrows. Unless expressly stated here, these steps do not have strict order limitation for execution, and may be executed in other order. In addition, at least part of steps in the flowcharts of the accompanying drawings may include a plurality of sub-steps or a plurality of phases, execution of these sub-steps or phases are not necessarily completed at the same moment, they may be executed at different moments, the execution order of them is not necessarily sequentially performed, and they may be executed by turns or alternatively with other steps or the at least one part of the sub-steps or the phases of the other steps.

Although the disclosure has been shown and described with reference to some examples of the disclosure, those skilled in the art will understand that various changes of forms and details can be made without departing from the scope of the disclosure. Hence, the scope of the disclosure is not limited to the example, but is limited by appended claims and their equivalents.

Additional non-limiting embodiments of the disclosure include the following.

embodiment 1. A communication method, including: determining a first message frame, the first message frame including information identifying a maximum single-type resource unit and/or a maximum multiple resource unit supported for using dual carrier modulation; and sending the first message frame.

embodiment 2. The communication method according to embodiment 1, the information is identified by a plurality of bits.

embodiment 3. The communication method according to embodiment 2, a first part in the plurality of bits is used for identifying a supported maximum single-type resource unit, and a second part in the plurality of bits is used for identifying a supported maximum multiple resource unit.

embodiment 4. The communication method according to embodiment 3, both the first part and the second part in the plurality of bits are comprised in a first capability information element of the first message frame.

embodiment 5. The communication method according to embodiment 3, a first bit in the first part used for identifying a supported first single-type resource unit and the second part are both comprised in a first capability information element of the first message frame.

embodiment 6. The communication method according to embodiment 5, other bits in the first part used for identifying supported other single-type resource units are comprised in a second capability information element, and the other single-type resource units are different from the first single-type resource unit.

embodiment 7. The communication method according to embodiment 6, in a case that the first bit identifies the supported first single-type resource unit, a second bit in the other bits identifies a supported second single-type resource unit, where a size of the second single-type resource unit is half of a size of the first single-type resource unit.

embodiment 8. The communication method according to any one of embodiments 5 to 7, the first single-type resource unit is 4*996-tone.

embodiment 9. The communication method according to any one of embodiments 4 to 7, the first capability information element is an extreme high-throughput physical layer capability information element, and the second capability information element is a high efficiency physical layer capability information element.

embodiment 10. A communication method, including: receiving a first message frame, the first message frame comprises information identifying a maximum single-type resource unit and/or a maximum multiple resource unit supported for using dual carrier modulation; and executing a communication operation based on the first message frame.

embodiment 11. The communication method according to embodiment 10, the information is identified by a plurality of bits.

embodiment 12. The communication method according to embodiment 11, a first part in the plurality of bits is used for identifying a supported maximum single-type resource unit, and a second part in the plurality of bits is used for identifying a supported maximum multiple resource unit.

embodiment 13. The communication method according to embodiment 12, both the first part and the second part in the plurality of bits are comprised in a first capability information element of the first message frame.

embodiment 14. The communication method according to embodiment 12, a first bit in the first part used for identifying a supported first single-type resource unit and the second part are both comprised in a first capability information element of the first message frame.

embodiment 15. The communication method according to embodiment 14, other bits in the first part used for identifying supported other single-type resource units are comprised in a second capability information element, and the other single-type resource units are different from the first single-type resource unit.

embodiment 16. The communication method according to embodiment 15, in a case that the first bit identifies the supported first single-type resource unit, a second bit in the other bits identifies a supported second single-type resource unit, where a size of the second single-type resource unit is half of a size of the first single-type resource unit.

embodiment 17. The communication method according to any one of embodiments 14 to 16, the first single-type resource unit is 4*996-tone.

embodiment 18. The communication method according to any one of embodiments 13 to 16, the first capability information element is an extreme high-throughput physical layer capability information element, and the second capability information element is a high efficiency physical layer capability information element.

embodiment 19. A communication device, including: a processing module, configured to: determine a first message frame, the first message frame including information identifying a maximum single-type resource unit and/or a maximum multiple resource unit supported for using dual carrier modulation; and a communication module, configured to: send the first message frame.

embodiment 20. A communication device, including: a communication module, configured to: receive a first message frame, the first message frame including information identifying a maximum single-type resource unit and/or a maximum multiple resource unit supported for using dual carrier modulation; and a processing module, configured to: control the communication module to execute a communication operation based on the first message frame.

embodiment 21. An electronic device, including a memory, a processor and a computer program stored on the memory and capable of running on the processor, when the computer program is executed by the processor, implements the method according to any one of embodiments 1 to 9.

embodiment 22. An electronic device, including a memory, a processor and a computer program stored on the memory and capable of running on the processor, when the computer program is executed by the processor, implements the method according to any one of embodiments 10 to 18.

embodiment 23. A non-temporary computer readable storage medium, the non-temporary computer readable storage medium stores a computer program, and the computer program, when executed by a processor, implements the method according to any one of embodiments 1 to 9.

What is claimed is:

1. A communication method, comprising:

determining a first message frame, wherein the first message frame comprises a high efficiency physical layer (HE PHY) capability information element, a DCM Max RU subfield in the HE PHY capability information element is configured to identify a maximum resource unit (RU) supported in a case where dual carrier modulation (DCM) is applied, a bit value of 0 for the DCM Max RU subfield indicates a maximum RU of 242-tone, a bit value of 1 for the DCM Max RU subfield indicates a maximum RU of 484-tone, a bit value of 2 for the DCM Max RU subfield indicates a maximum RU of 996-tone, and a bit value of 3 for the DCM Max RU subfield indicates a maximum RU of 2×996-tone; and sending the first message frame.

2. The communication method according to claim 1, wherein information in the first message frame is identified by a plurality of bits.

3. The communication method according to claim 2, wherein a first part in the plurality of bits is configured to identify a supported maximum resource unit, and a second part in the plurality of bits is configured to identify a supported maximum multiple resource unit.

4. The communication method according to claim 3, wherein both the first part and the second part in the plurality of bits are comprised in an extreme high-throughput physical layer (EHT PHY) capability information element of the first message frame; or a first bit in the first part configured to identify support for a first resource unit and the second part are both comprised in an extreme high-throughput physical layer (EHT PHY) capability information element of the first message frame.

5. The communication method according to claim 4, wherein other bits in the first part configured to identify support for other resource units are comprised in the HE PHY capability information element, and the other resource units are different from the first resource unit.

6. The communication method according to claim 5, wherein in a case where the first bit identifies support for the first resource unit, a second bit in the other bits identifies support for a second resource unit, wherein a size of the second resource unit is half of a size of the first resource unit.

7. The communication method according to claim 4, wherein the first resource unit is 4×996-tone.

8. The communication method according to claim 1, wherein the first message frame comprises an extreme high-throughput physical layer (EHT PHY) capability information element, the EHT PHY capability information element comprises a subfield configured to identify a multiple resource unit (MRU) supported in a case where the DCM is applied, a bit value of the subfield equal to a first value indicates a supported MRU of 52+26-tone, a bit value of the subfield equal to a second value indicates a supported MRU of 106+26-tone, a bit value of the subfield equal to a third value indicates a supported MRU of 484+242-tone, a bit value of the subfield equal to a fourth value indicates a supported MRU of 996+484-tone, a bit value of the subfield equal to a fifth value indicates a supported MRU of 996+484+242-tone, a bit value of the subfield equal to a sixth value indicates a supported MRU of 2×996+484-tone, a bit value of the subfield equal to a seventh value indicates a supported MRU of 3×996-tone, and a bit value of the subfield equal to an eighth value indicates a supported MRU of 3×996+484-tone.

9. A non-transitory computer readable storage medium, wherein the non-transitory computer readable storage medium stores a computer program, and the computer program, when collectively executed by one or more processors of an electronic device, causes the electronic device to perform the method according to claim 1.

10. A communication method, comprising:

receiving a first message frame, wherein the first message frame comprises a high efficiency physical layer (HE PHY) capability information element, a DCM Max RU subfield in the HE PHY capability information element is configured to identify a maximum resource unit (RU) supported in a case where dual carrier modulation (DCM) is applied, a bit value of 0 for the DCM Max RU subfield indicates a maximum RU of 242-tone, a bit value of 1 for the DCM Max RU subfield indicates a maximum RU of 484-tone, a bit value of 2 for the DCM Max RU subfield indicates a maximum RU of 996-tone, and a bit value of 3 for the DCM Max RU subfield indicates a maximum RU of 2×996-tone; and executing a communication operation based on the first message frame.

11. The communication method according to claim 10, wherein information in the first message frame is identified by a plurality of bits.

12. The communication method according to claim 11, wherein a first part in the plurality of bits is configured to identify a supported maximum resource unit, and a second part in the plurality of bits is configured to identifying a supported maximum multiple resource unit.

13. The communication method according to claim 12, wherein both the first part and the second part in the plurality of bits are comprised in an extreme high-throughput physical layer (EHT PHY) capability information element of the first message frame; or a first bit in the first part configured to identify support for a first resource unit and the second part are both comprised in an extreme high-throughput physical layer (EHT PHY) capability information element of the first message frame.

14. The communication method according to claim 13, wherein other bits in the first part configured to identify support for other resource units are comprised in the HE PHY capability information element, and the other resource units are different from the first resource unit.

15. The communication method according to claim 14, wherein in a case where the first bit identifies support for the first resource unit, a second bit in the other bits identifies support for a second resource unit, wherein a size of the second resource unit is half of a size of the first resource unit.

16. The communication method according to claim 13, wherein the first resource unit is 4×996-tone.

17. The communication method according to claim 10, wherein the first message frame comprises an extreme high-throughput physical layer (EHT PHY) capability information element, the EHT PHY capability information element comprises a subfield configured to identify a multiple resource unit (MRU) supported in a case where the DCM is applied, a bit value of the subfield equal to a first value indicates a supported MRU of 52+26-tone, a bit value of the subfield equal to a second value indicates a supported MRU of 106+26-tone, a bit value of the subfield equal to a third value indicates a supported MRU of 484+242-tone, a bit value of the subfield equal to a fourth value indicates a supported MRU of 996+484-tone, a bit value of the subfield equal to a fifth value indicates a supported MRU of 996+484+242-tone, a bit value of the subfield equal to a sixth value indicates a supported MRU of 2×996+484-tone, a bit value of the subfield equal to a seventh value indicates a supported MRU of 3×996-tone, and a bit value of the subfield equal to an eighth value indicates a supported MRU of 3×996+484-tone.

18. An electronic device, comprising:

a memory storing a computer program;

one or more processors; and wherein the computer program, when collectively executed by the one or more processors, causes the electronic device to perform the method according to claim 10.

19. A non-transitory computer readable storage medium, wherein the non-transitory computer readable storage medium stores a computer program, and the computer program, when collectively executed by one or more processors of an electronic device, causes the electronic device to perform the method according to claim 10.

20. An electronic device, comprising:

a memory storing a computer program;

one or more processors; and wherein the computer program, when collectively executed by the one or more processors, causes the electronic device to:

determine a first message frame, wherein the first message frame comprises a high efficiency physical layer (HE PHY) capability information element, a DCM Max RU subfield in the HE PHY capability information element is configured to identify a maximum resource unit (RU) supported in a case where dual carrier modulation (DCM) is applied, a bit value of 0 for the DCM Max RU subfield indicates a maximum RU of 242-tone, a bit value of 1 for the DCM Max RU subfield indicates a maximum RU of 484-tone, a bit value of 2 for the DCM Max RU subfield indicates a maximum RU of 996-tone, and a bit value of 3 for the DCM Max RU subfield indicates a maximum RU of 2×996-tone; and send the first message frame.

* * * * *